United States Patent Office 3,650,926
Patented Mar. 21, 1972

3,650,926
RADIOLYTIC TREATMENT OF ORGANIC INDUSTRIAL WASTES IN A PRESSURIZED OXYGEN ATMOSPHERE
Forrest N. Case, Oak Ridge, and David E. Smiley, Knoxville, Tenn., assignors to the United States of America as represented by the United States Atomic Energy Commission
No Drawing. Filed Oct. 7, 1969, Ser. No. 864,520
Int. Cl. B01j 1/10
U.S. Cl. 204—158                2 Claims

ABSTRACT OF THE DISCLOSURE

The present invention relates to a method of increasing the light transparency and reducing the biological oxygen demand of organic-containing waste solutions which comprises the step of exposing such solutions to penetrating ionizing radiation under pressure of an oxygen-containing atmosphere of at least 1000 p.s.i. until the desired degree of optical and ultraviolet transmittancy as well as biological oxygen demand have been reached.

BACKGROUND OF THE INVENTION

The invention described herein was made in the course of, or under, a contract with the United States Atomic Energy Commission. It relates to an improved process for the radiolytic treatment of industrial waste streams containing organic materials such as lignin and organic dyes in such a manner as to reduce the biological oxygen demand and color to a level required for safe disposal.

The industrial waste streams generated in the manufacture of paper and pulp and in textile manufacturing processes contain organic materials which can upset the natural biological balance of the water into which they are introduced by reducing the light that can penetrate the water necessary for photosynthetic processes to take place. The principal contaminants which contribute to the color are lignin, organic dyes, and inks. These materials are highly absorptive to light wavelengths running from the ultraviolet to the visible region, i.e., from about 250 millimicrons (m$\mu$) up to about 650 m$\mu$.

As the term is used herein, biological oxygen demand (BOD) means the quantity of oxygen required for biochemical oxidation of a given medium in a given time at a given temperature; for example, 5 days at 20° C. An acceptably low BOD index value would be one which falls in the range 5 to 35 parts per million. Thus, an industrial waste stream of the character described which has been treated in accordance with this invention to a BOD value in the range 5 to 30 parts per million will transmit sufficient light in the ultraviolet and visible regions to allow normal photosynthetic processes to occur without deleteriously upsetting the normal ecological balance.

SUMMARY OF THE INVENTION

With this background in mind, it is an object of this invention to provide a process for treating organic-bearing aqueous waste streams of the kind which issue from such sources as the manufacture of pulp and paper, textile processes, and food processing, petroleum, and chemical industry.

It is a further object of this invention to treat waste streams of the character described to a point where their BOD has been reduced to a level which allows disposal into natural flowing streams.

It is a further object of this invention to allow the preceding objects to be satisfied in an economic and efficient manner.

The present invention is predicated on the discovery that light absorption from industrial wastes of the character described and BOD of these wastes can be considerably reduced to safe levels by irradiating such wastes in a pressurized oxygen-containing atmosphere with high energy radiation until the treated solution has reached a desired degree of light transparency and BOD.

When lignin-bearing aqueous waste solutions are exposed to the gamma rays from a cobalt-60 source in air atmospheric pressure up to gamma dosages of about $2.5 \times 10^7$ roentgens (r.), one can note that three changes take place: the pH changes to a slightly more acidic value, the BOD is decreased with increasing dosage, and the light transmittancy in the near-ultraviolet and optical regions decreases. Total absorption in the ultraviolet region at 280 m$\mu$ is still apparent even after total dosages of about $2.5 \times 10^7$ r. On the other hand, when the same material is irradiated under a high pressure of oxygen or air of at least about 1000 p.s.i., some important and unexpected differences are noted. In the first place, an extremely marked change in pH occurs, indicating an accelerated oxidative process which apparently leads to acid-forming end- or by-products. In any event, the end- or by-products are such as to simultaneously lower the BOD, increase the optical transmittancy of the solution, and, in addition, increase the ultraviolet transparency. These results are achieved at total dosages far less, by as much as an order of magnitude, than that which is achievable by irradiation in air at atmospheric pressure to produce increased transmittancy. The ultraviolet transparency is increased from 0 to as much as about 60 percent when the irradiated liquid is pressurized in an oxygen-containing amtosphere.

The improvement obtained from the process of this invention will be demonstrated in the following examples.

Example I

This example is designed to demonstrate the novel effects achieved by irradiating lignin-bearing wastes and textile plant waste to a pressure of at least 1000 p.s.i. in an oxygen-containing atmosphere. For the purposes of this invention, air and pure oxygen are equivalent so long as they are pressurized to at least 1000 p.s.i.

Effluent from the sewage disposal plant of the city of Knoxville, Tenn., having color introduced from lignin, and textile plant effluent were irradiated at a gamma flux of $1.2 \times 10^7$ r./hr.

For purposes of comparison, a first set of samples of 125 ml. each were irradiated in air at atmospheric pressure for periods of 10 to 120 minutes, one sample being set aside as an unirradiated control sample. The samples were analyzed for BOD, pH, and percent light transmission. The results are shown in Table I below.

TABLE I

| Run No. | Time, min. | Exposed dose, γ | pH | BOD | Light transmission, percent, at— | | | |
|---|---|---|---|---|---|---|---|---|
| | | | | | 625 mμ | 500 mμ | 400 mμ | 280 mμ |
| 1 | 0 | 0 | 7.0 | 202 | 58 | 48 | 22 | 0 |
| 2 | 10 | 2×10⁶ | 7.1 | 128 | 52 | 43 | 15 | 0 |
| 3 | 20 | 4×10⁶ | 6.8 | 101 | 51 | 41 | 12 | 0 |
| 4 | 30 | 6×10⁶ | 6.7 | 85 | 41 | 26 | 5 | 0 |
| 5 | 60 | 1.2×10⁷ | 6.4 | 76 | 48 | 36 | 8 | 0 |
| 6 | 120 | 2.4×10⁷ | 6.1 | 53 | 37 | 26 | 5 | 0 |

A second set of 15-ml. samples were irradiated in air at 2000 p.s.i. The samples were analyzed for BOD, pH, and percent light transmission. The results are shown in Table II below.

TABLE II

| Run No. | Time, min. | Exposed dose, γ | pH | BOD | Light transmission, percent, at— | | | |
|---|---|---|---|---|---|---|---|---|
| | | | | | 625 mμ | 500 mμ | 400 mμ | 280 mμ |
| 7 | 0 | 0 | 7.0 | 202 | 58 | 48 | 22 | 0 |
| 8 | 10 | 2.3×10⁵ | 6.6 | 166 | 54 | 50 | 26 | 0 |
| 9 | 20 | 4.6×10⁵ | 6.1 | 140 | 62 | 62 | 38 | 1 |
| 10 | 30 | 7×10⁵ | 6.0 | 122 | 65 | 68 | 54 | 8 |
| 11 | 60 | 1.4×10⁶ | 4.3 | 100 | 71 | 74 | 65 | 25 |
| 12 | 120 | 2.8×10⁶ | 3.4 | 28 | 87 | 88 | 83 | 58 |

Several major points of difference can be noted by comparng runs 1–6, irradiated at atmospheric pressure, with runs 7–12, which were irradiated at 2000 p.s.i. air pressure. Although the samples irradiated at atmospheric pressure were exposed to a higher gamma intensity, the drop in BOD and pH was relatively small compared to the samples irradiated at 2000 p.s.i. air pressure. Irradiation at 2000 p.s.i. pressure, in addition, yielded an essentially optically clear solution within 30 minutes with increasing ultraviolet transparency. In marked contrast, irradiations conducted at atmospheric pressure in air actually reduced light transmission in the optical region and had no effect in improving light transmission in the ultraviolet region, even at total dosages of nearly an order of magnitude higher as compared to samples irradiated under pressure.

Example II

An opaque paper mill effluent was irradiated to a dose of $2.4 \times 10^7$ r. under 2000 p.s.i. oxygen. The opaque solution was converted to a pale yellow solution containing a white fibrous material suspended therein. Apparently, the white fibrous material was pulp contained in the waste, which was also bleached by the process of this invention.

Example III

An aqueous slurry of raw sulfite, wood pulp, brown in color, was irradiated in the presence of sodium hypochlorite under an oxygen pressure of 1600 p.s.i. for 2 hours. The dose rate was $2 \times 10^7$ r./hr. The brown fibrous material was converted to white fibrous material. The combination of radiation, hypochlorite, and high pressure oxygen gave better decolorization than did hypochlorite alone or irradiation and hypochlorite in the absence of high pressure oxygen. The benefits of the oxidizing power of hypochlorite ion to the high pressure radiolysis can be achieved with any water-soluble hypochlorite salt.

What is claimed is:

1. A method of increasing the light transparency and reducing the biological oxygen demand of organic-containing waste solutions which comprises the step of exposing such solutions to penetrating ionizing radiation under pressure of an oxygen-containing atmosphere of at least 1000 p.s.i. until the desired degree of optical and ultraviolet transmittancy as well as biological oxygen demand have been reached.

2. The method according to claim 1 in which the waste solution to be treated contains a water-soluble hypochlorite salt.

References Cited

UNITED STATES PATENTS 3,537,966  11/1970  Steinberg _____ 204—157.1 H
3,553,089  1/1971   Mytelka et al. ____ 204—158 HE

OTHER REFERENCES

C & E News, July 14, 1969, pp. 98 and 99.

HOWARD S. WILLIAMS, Primary Examiner